3,646,000
POLYMERIZATION CATALYST
Bertalan Horvath, Southern London, England, assignor to Phillips Petroleum Company
No Drawing. Filed Apr. 23, 1969, Ser. No. 818,805
Int. Cl. C08f 3/02, 3/04, 3/08
U.S. Cl. 260—93.7           1 Claim

ABSTRACT OF THE DISCLOSURE

An olefin polymerization process employing a reduced titanium oxide catalyst on a silica support in the presence of an organoaluminum halide, which produces particle-form polymer having molecular weights greater than a million.

---

This invention pertains to olefin polymerization.

In one of its more specific aspects, this invention pertains to catalysts suitable for the production of high molecular weight polymers.

In processes for the polymerization of 1-olefins, the nature of the catalyst has been found to have an effect on the properties of the polymer produced. For example, a large number of catalysts having particular value because of the high molecular weight of the product produced by their use have been developed.

By use of the catalyst of this invention, polymers having a molecular weight in excess of one million can be produced.

According to the method of this invention there is provided a process for polymerizing a 1-olefin, such as ethylene, which comprises contacting the 1-olefin at temperatures between about $-25°$ C. and about $250°$ C. with a catalyst comprising a particulate solid in combination with a reduced titanium oxide and an hydrocarbylaluminum halide of the general formula $R_nAlX_{3-n}$, said titanium oxide being prepared from an organotitanium compound selected from one of the formulae (I)    $(R')_mTi(OR')_{4-m}$ or
(II)   $(RO)_mTi(OR')_{4-m}$ or
(III)  $(RO)_mTi(NR'_2)_{4-m}$ or
(IV)   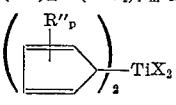

or (V)    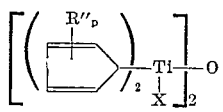

or (VI)   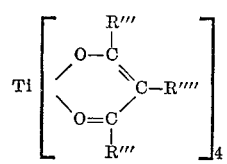

said formulae being as hereinafter defined.

Accordingly, it is an object of this invention to provide a new polymerization process.

It is another object of this invention to provide a process for producing a high molecular weight index polymer.

The polymerization process to which this invention is applicable is that which is frequently carried out in the presence of an activated chromium oxide-supported catalyst, the reaction being carried out in either the solution process or in the slurry process, the reaction being conducted in the presence of an inert hydrocarbon, such as a paraffin or cycloparaffin. Reaction temperatures range from about $-25°$ C. to about $250°$ C. at reaction pressures sufficient to maintain the hydrocarbon in the liquid phase.

The particulate solid acts as a catalyst support and comprises silica, silica-alumina, or other materials such as alumina, zirconia, thoria and fluorided alumina.

In the formula $$(R')_mTi(OR')_{4-m}$$

R is selected from the group consisting of alkyl, aryl and cycloalkyl groups and combinations thereof such as aralkyl, alkaryl and the like, each group having 1 to 12 carbon atoms, inclusive; R' is selected from the group consisting of R, cyclopentadienyl and alkenyl groups having 2 to 12 carbon atoms, inclusive, such as ethenyl, propenyl, isopropenyl, butenyl and the like, and $m$ is an integer from 0 to 4, inclusive.

In the formula $$(RO)_mTi(OR')_{4-m}$$

R, R', and $m$ are as defined above.

In the formula $$(RO)_mTi(NR'_2)_{4-m}$$

R, R', and $m$ are as defined above.

In the formula

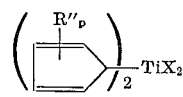

R'' is selected from the group consisting of alkyl groups having up to 6 carbon atoms, or from cyclopentyl, cyclohexyl and phenyl, X is a monovalent anion such as fluoride, chloride, bromide, iodide, nitrate, chlorate, bromate, fluoborate, and the like and is preferably a halide, and $p$ is an integer having a value of 0, 1, 2, or 3.

In the formula

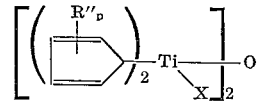

R'', X, and $p$ are as defined above.

In the formula

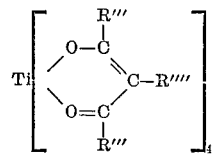

R''' is defined as was R, above, except that the upper carbon atom limit is 8 instead of 12, and R'''' is selected from the group consisting of hydrogen and R'''.

Examples of the titanium compounds of the first and second formulae, above, are titanium methoxide, titanium phenoxide, triethylenyltitanium cyclohexoxide and triethoxytitanium-6-dodecenyloxide.

Examples of the titanium compounds of the third formula, above, are tetra(dimethylamino)titanium, and di(diethylamino)diethoxytitanium.

The organic moiety in the compounds of the fourth and fifth formulae, above, is derived from compounds such as cyclopentadiene and 3,4-dicyclopentylcyclopentadiene in which the location of the R'' substituent is stated with respect to titanium bonding to carbon atom number 1 and the double bonds of the cyclopentadiene molecular are at the 2 and 4 positions.

Examples of the titanium compounds of the sixth formula are titanium acetylacetonate and hydrocarbyl-substituted titanium acetylacetonates.

The hydrocarbylaluminum halide, usually referred to as an alkylaluminum halide for convenience, hereinafter termed the "cocatalyst," has the general formula $R_nAlX_{3-n}$, as set forth above, where R is as defined above, X is a halogen and $n$ is a fraction, integer, or mixed number such that $3-n$ has a positive value. Examples of compounds suitable as cocatalysts are ethylaluminum dichloride, diethylaluminum chloride, and ethylaluminum sesquichloride.

The catalyst of this invention is prepared by impregnating the silica-containing support with a sufficient quantity of the titanium compound, preferably from an organic solvent, to give from about 1 to about 15 weight percent of titanium in the supported catalyst. The catalyst is dried and is then activated in air at temperatures from about 900 to about 2000° F. for a period from about 30 minutes to about 10 hours. The material formed is referred to herein as titanium oxide but may actually be present as a different compound such as a compound formed by reaction of the titanium compound and the support material. Thereafter, the catalyst is reduced by contacting preferably with a gaseous reducing agent such as hydrogen or carbon monoxide, or mixtures of hydrogen and carbon monoxide, at temperatures from about 900 to 1500° F. for a period of from about 30 minutes to about 10 hours.

The cocatalyst is usually charged to the reactor before, at the same time, or after introduction of the supported titanium catalyst, but may be introduced as a component contained in the olefin stream being polymerized. In any method of addition, the amount of cocatalyst employed is in the range from about 0.5 to about 5 parts by weight per 100 parts of the combined weights of the titanium compound and its silica-containing support.

The polymerization of the 1-olefin or mixtures thereof, to which the catalyst of this invention is applicable, is that process conventionally carried out in which a hydrocarbon is employed as the reaction medium and maintained in the liquid state by means of the pressure under which the process is conducted. Other than the absence of the chromium compound in the catalyst of the present invention, all other operating conditions and procedures are substantially the same as employed in that olefin polymerization process in which a chromium-containing catalyst is employed, such as described in U.S. Pat. 2,925,721 or British Pat. 853,414.

The following will serve to illustrate the method of preparation and use of the catalyst of this invention.

A commercially available microspheroidal intermediate density silica, conventionally employed as an olefin polymerization catalyst support, was impregnated with a toluene solution of tetra(dimethylamino)titanium, $Ti[N(CH_3)_2]_4$, to establish on the support an amount of titanium equal to about 8 percent of the weight of the resulting impregnated support. The titanium-impregnated support was dried and thereafter activated in air at about 1000° F. for 5 hours, after which the catalyst had a white coloration.

The catalyst was then reduced by contacting with a stream of gaseous hydrogen for a period of about one hour at a temperature of about 1000° F. during which period the catalyst assumed a blue coloration.

The catalyst was charged to a reactor with an amount of diethylaluminum chloride cocatalyst equivalent to about 1 percent of the weight of the titanium impregnated catalyst. Particle-form polymerization of ethylene was conducted in an isopentane environment with ethylene at 220° F., and 450 p.s.i.g. Productivity during a 90-minute period was 482 pounds of particle-form polymer per pound of catalyst.

The polymer had an inherent viscosity of 15 dl./g. in tetralin at 130° C., and its melt index and high load melt index were beyond the upper limits of measurability, its molecular weight accordingly being estimated as being in excess of 1 million.

These data indicated the operability of the catalyst of this invention to produce high molecular weight polymer under the conditions of conventional olefin polymerization of temperature, pressure, space velocities, contact time and the like.

The above disclosure will suggest modifications to this invention. However, such are considered as being within the skill of the art.

What is claimed is:
1. A process for polymerizing a 1-olefin which comprises contacting said 1-olefin with a catalyst under polymerization conditions, said catalyst consisting essentially of as its effective ingredients a hydrocarbylaluminum halide of the general formula

$$R_nAlX_{3-n}$$

and a supported titanium derivative of tetra(dimethylamino)titanium, in which formula R is alkyl, cycloalkyl, aryl or combinations thereof, each having 1 to 12 carbon atoms, inclusive, X is a monovalent anion and $n$ is an integer from 1 to 2, said derivative being formed by impregnating a support selected from the group consisting of silica, silica alumina, alumina, xirconia, thoria and fluorided alumina with said tetra(dimethylamino)titanium, activating the impregnated support, reducing the activated impregnated support with a gaseous reducing agent to form said derivative and mixing said derivative with said hydrocarbylaluminum halide to form said catalyst.

References Cited
UNITED STATES PATENTS

| | | | |
|---|---|---|---|
| 2,912,421 | 11/1959 | Juveland | 260—93.7 |
| 3,318,863 | 5/1967 | Juveland | 260—94.9 |

JOSEPH L. SCHOFER, Primary Examiner

A. HOLLER, Assistant Examiner

U.S. Cl. X.R.

260—94.9 D